H. CHELSTROM.
SPRING FRAME FOR MOTOR CYCLES.
APPLICATION FILED JUNE 23, 1914.
1,220,606.
Patented Mar. 27, 1917.
3 SHEETS—SHEET 1.
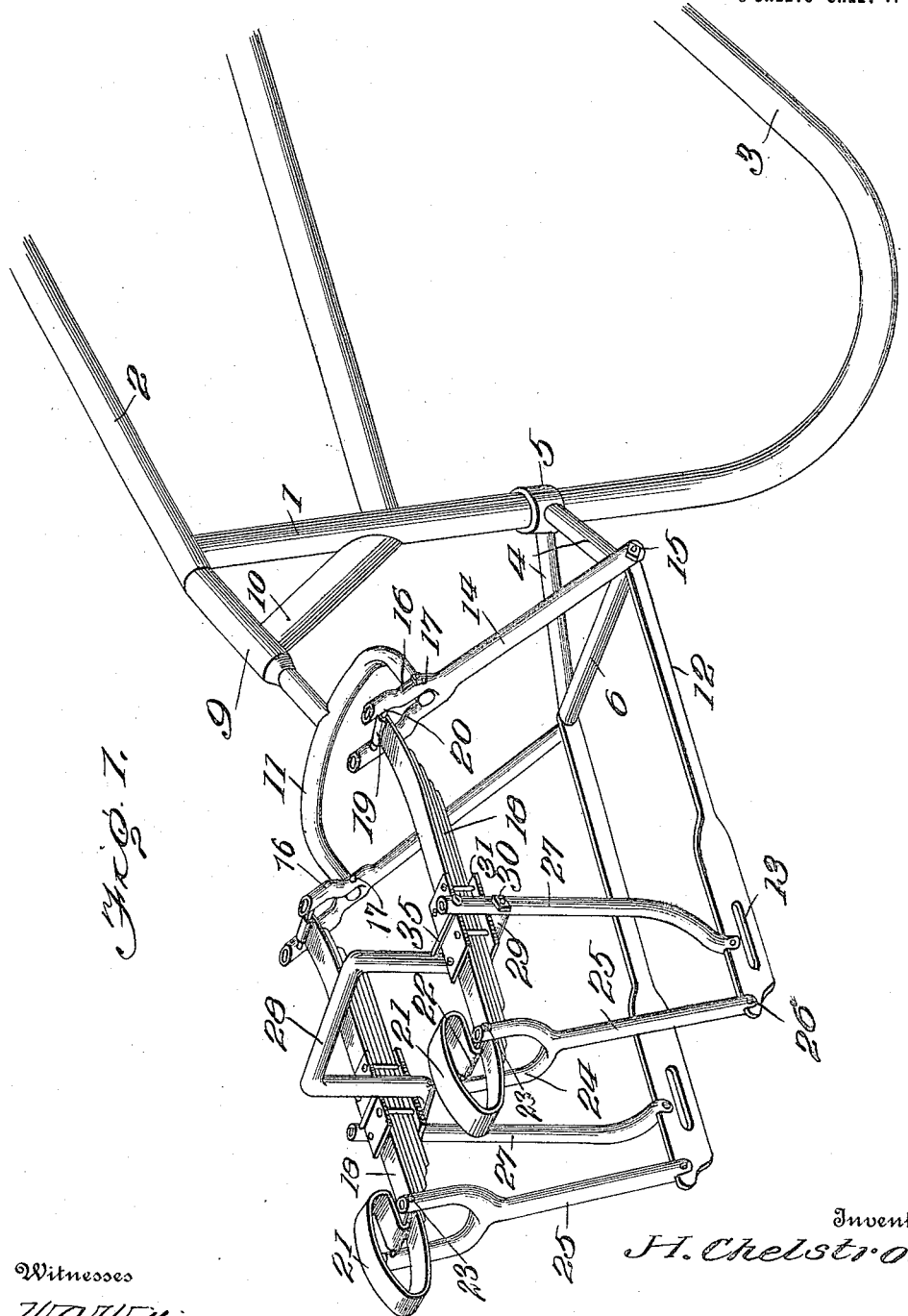
Witnesses
W. A. Williams
Inventor
H. Chelstrom
By
Attorneys

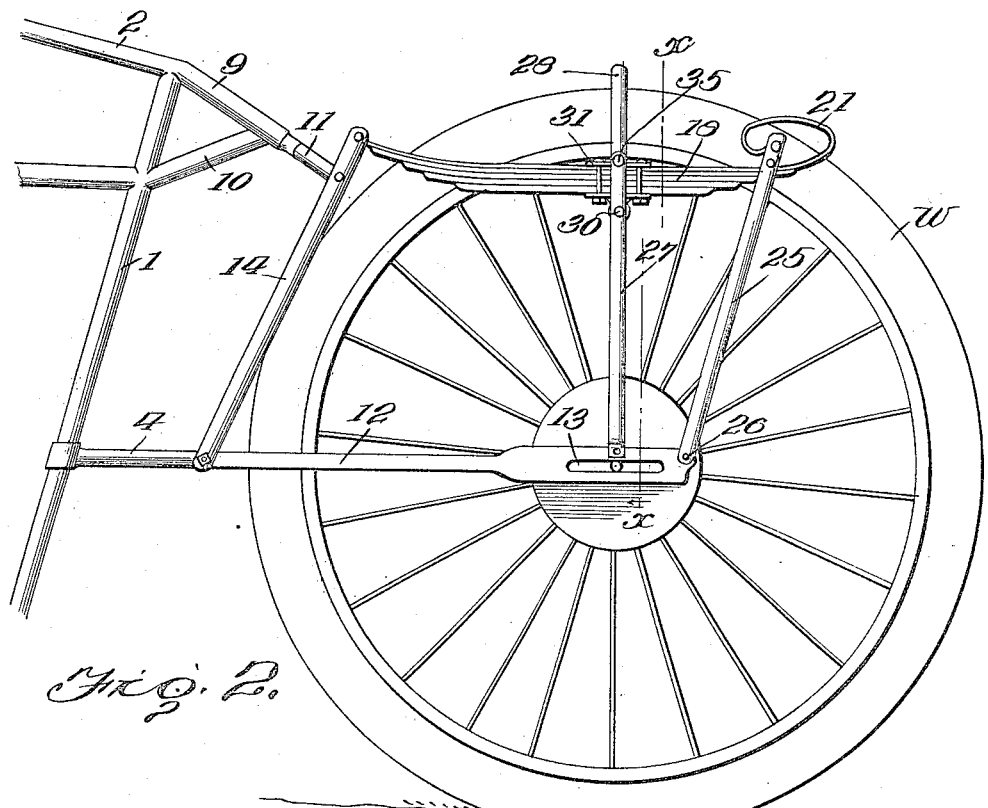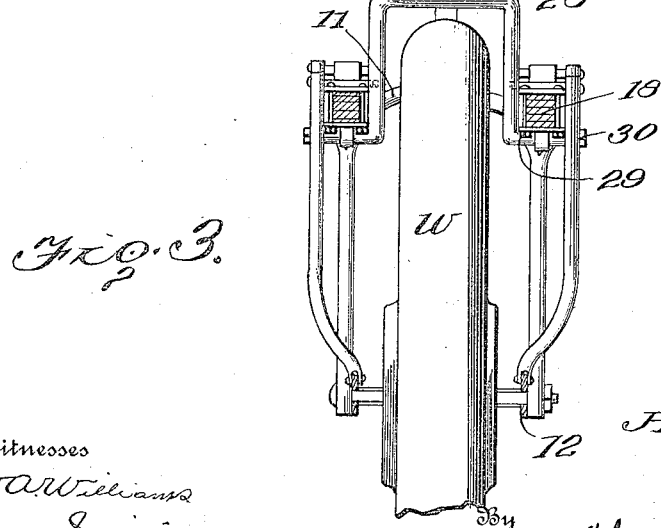

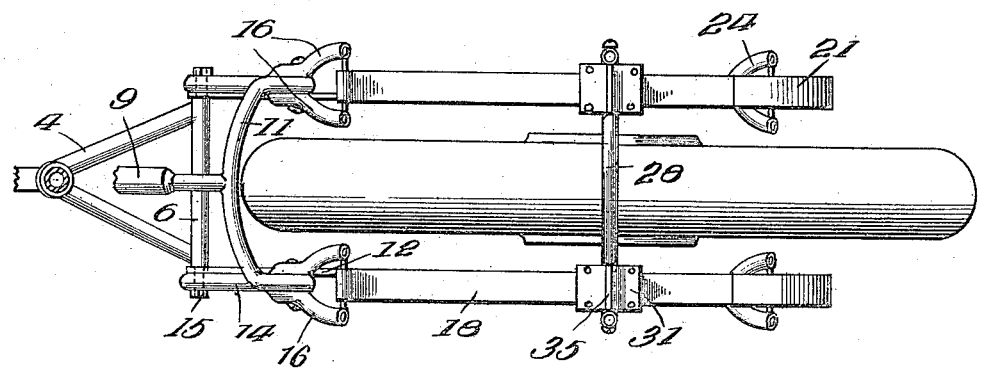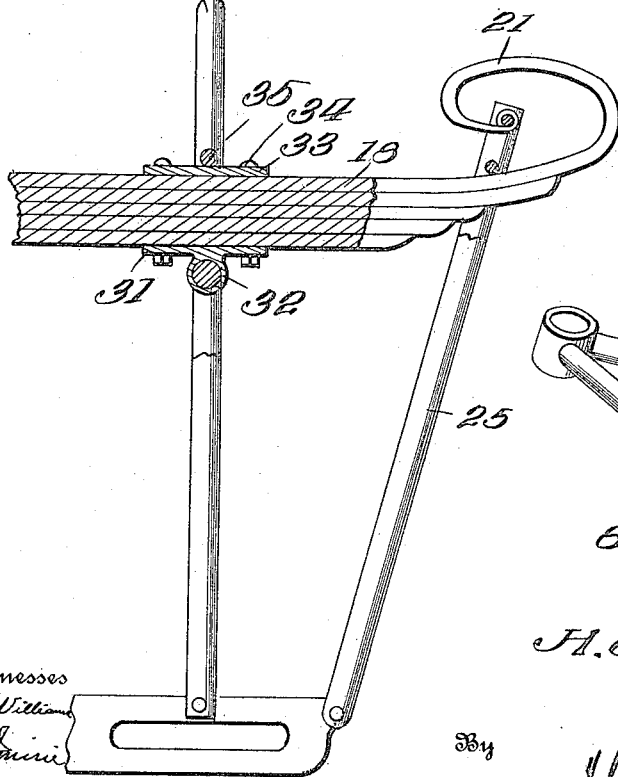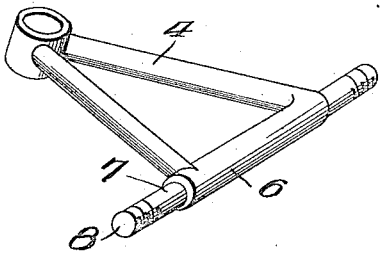

UNITED STATES PATENT OFFICE.

HERBERT CHELSTROM, OF TURTLE LAKE, WISCONSIN, ASSIGNOR OF ONE-THIRD TO C. L. R. DUNBERG, OF TURTLE LAKE, WISCONSIN.

SPRING-FRAME FOR MOTOR-CYCLES.

1,220,606. Specification of Letters Patent. Patented Mar. 27, 1917.

Application filed June 23, 1914. Serial No. 846,834.

*To all whom it may concern:*

Be it known that I, HERBERT CHELSTROM, citizen of the United States, residing at Turtle Lake, in the county of Barron and State of Wisconsin, have invented certain new and useful Improvements in Spring-Frames for Motor-Cycles, of which the following is a specification.

This invention relates to spring frames for motor cycles and has as its object to provide a frame which may be readily assembled with the ordinary frame of a motor cycle, and in which is to be mounted the rear wheel, the frame being so constructed as to effectually cushion the passage of the wheel over the ground surface and absorb all shocks to which the wheel is subjected.

In the accompanying drawings:

Figure 1 is a perspective view of the motor cycle spring frame embodying the present invention.

Fig. 2 is a side elevation thereof.

Fig. 3 is a vertical transverse sectional view on the line x—x of Fig. 2.

Fig. 4 is a top plan view of the frame.

Fig. 5 is a vertical front to rear section through a portion of one side of the frame.

Fig. 6 is a perspective view of one member of the frame.

Corresponding and like parts are referred to in the following description and indicated in all the views of the accompanying drawings by the same reference characters.

In the drawings, the numeral 1 indicates one of the bars of the ordinary frame of the motor cycle, this bar being disposed approximately vertical, and the numerals 2 and 3 indicate respectively the upper and lower reaches of the said frame. The spring frame embodying the present invention includes a bracket member having rearwardly diverging arms 4 supporting at their forward ends a collar 5 which is fitted to the frame bar 1 in the manner clearly shown in Figs. 1 and 2 of the drawings. The arms 4 at their rear ends are connected by a cross member 6 having its ends projecting laterally beyond the said rear ends of the arms 4 and recessed, as at 7, and threaded as at 8. A second bracket member includes an arm 9 secured in any suitable manner to the frame of the motor cycle at a point adjacent the rear end of the upper reach 2, this arm being braced by means of a brace arm 10 which is secured at its upper end thereto and at its lower end is secured to the bar 1. The arm 9 is provided at its rear end with a yoke, the arms of which are indicated by the numeral 11, the rear portion of the yoke arms extending in spaced parallel relation with respect to each other.

The spring frame embodying the invention includes a pair of side bars 12, each fitted at its forward end pivotally to one of the reduced portions 7 of the bracket member shown in Fig. 6, the bars extending rearwardly and having their rear portions increased in width and formed with a slot 13. The ends of the spindle for the hub of the rear wheel are secured at the proper adjustment in the slots 13. The frame further includes a pair of forward uprights 14 which are fitted at their lower ends to the reduced ends of the cross piece 6 and are secured in place by means of nuts 15 threaded onto the portions 8 of the said cross piece. The uprights 14 of the frame are inclined upwardly and rearwardly and have their upper ends of yoke formation, the arms of the yoke of each upright being indicated by the numeral 16 and the yokes being disposed transversely of the said frame. The arms of each yoke receive between them one of the arms of the yoke 11, and bolts 17 are secured through these parts and serve to rigidly secure the uprights 14 between the bracket 4 and the yoke 11. The cushioning springs are indicated by the numeral 18 and each is comprised of a number of superposed united leaves, and the forward end of the longest leaf of each spring is coiled to form a sleeve 19 pivotally fitting a bolt 20, which bolts are secured through the upper ends of the arms of each yoke 16. The opposite end of the said leaf of each spring is coiled upon itself in an upward direction, as indicated at 21, the terminal of the coil extending rearwardly beneath the body thereof and being bent to form a sleeve 22 pivotally fitting a bolt 23 which bolts are secured each through the upper ends of the arms of yokes 24 formed at the upper ends of a pair of uprights 25, which uprights are pivoted at their lower ends, as at 26, to the rear ends of the frame bars 12. By reference to Figs. 1 and 2 of the drawings, it will be observed that the uprights 25 are inclined upwardly and rearwardly but are not parallel to the uprights 16 but more nearly vertically disposed. At this point it will be apparent that the structure so far described comprises a quadrilateral frame, the upper and lower sides of which are approximately parallel, the upper side comprising a resilient element, the said frame further including a rigid forward side and a side opposite thereto and non-parallel with respect thereto connecting the rear ends of the upper and lower sides of the frame. It will furthermore be apparent that inasmuch as the rear wheel, which is indicated by the reference character W, is supported between the lower side members 12 of the frame, when weight is imposed upon the main frame, there will be a tendency for the said side members 12 to swing upwardly about the portions 7 of the cross piece 6 as pivots, and that inasmuch as the members 25 are non parallel to the members 14, there will be a binding action placing the springs 18 under tension. In order to add to the efficiency of the device, there is provided an intermediate upright comprising a pair of members 27 secured at their lower ends to the broadened rear end portions of the frame bars 12 and projecting substantially vertically from these bars and located in advance of the upright members 25. The upper ends of the members 27 are connected by means of an inverted V-shaped yoke member 28 having the ends of its spaced portions bent to extend laterally in opposite directions, as at 29, and threaded and fitted at their ends through openings in the members 27 near the upper ends thereof, nuts 30 being fitted onto the said threaded ends of the portions 29 whereby to secure the parts in assembled relation. By reference to Figs. 1, 3 and 4, it will be observed that the end portions 29 of the yoke 28 are of such length that when assembled with the members 27, the side portions of the yoke member 28 will be spaced from the ends of the projecting upper portions of the members 27 a sufficient distance to permit of the springs 18 being received between these parts, and in order that the springs may be connected to the said end portions of the yoke member, a clip plate 31 is disposed against the under side of each spring 18 and is provided with an integral sleeve portion 32 fitting the respective end of the said yoke portion 28. Another clip plate 33 is disposed upon the upper side of each spring and bolts 34 are secured through the projecting edge portions of the clip plates 31 and 33. In order to further brace the connection between the members 27 and the said yoke member, bolts 35 are secured through the side portions of the yoke member and through the upper ends of the member 27 and extend transversely above the upper clip plates 33. It will now be apparent that the wheel W is arranged to rotate between the sides of the frame and within the yoke member 28 and that the springs 18 lie at opposite sides of the upper portion of the wheel so that the space above the wheel is left clear to permit of ready mounting and dismounting.

As before stated, the structure is, in effect, in the form of a quadrilateral frame, the forward end of which is rigid with relation to the main frame of the motor cycle, the opposite side of the frame being non-parallel to the first-mentioned side, the lower side of the frame being pivoted at its forward and rear ends to the first and second-mentioned sides respectively of the frame, and the top of the frame comprising a resilient element extending between the upper ends of the said first and second-mentioned sides of the frame. The frame further includes, as above described, the intermediate member which is fixed to the lower member of the frame and to the spring which comprises the upper member of the frame. When weight is imposed upon the frame, the lower member thereof will be swung forwardly upon its pivot, but further movement is yieldably resisted by the spring, due to the fact that the rear member of the frame is in non-parallel relation to the forward member thereof and as a consequence, there will be a tendency for the coiled rear end of the spring to close thereby placing the spring under tension. Inasmuch as the intermediate member of the frame extends vertically or substantially vertical, or at any rate, is inclined to a less degree than either the front or rear member of the frame and because of the fact that the lower member of the frame tends to approach the upper or spring member thereof, as the parts are moved upon their pivots, the intermediate portion of the spring will be subjected to upward strain tending to bow the spring.

Having thus described the invention, what is claimed as new is:

1. A device of the class described, including spaced counterpart frame sections connected to each other and each including a rigid member, a rigid member pivotally connected thereto and extending rearwardly therefrom, a rigid member secured to the second mentioned member and extending upwardly therefrom in nonparallel relation to the first mentioned member, and a leaf spring secured to the upper end of the first mentioned member and extending rearwardly and bowed and secured at the end of its bow to the last mentioned member, the second mentioned member being provided with means for connection to a wheel spindle.

2. A device of the class described, including spaced rigid members, means connecting the members, spaced rigid members pivotally connected to the lower ends of the first mentioned members and extending rearwardly therefrom, spaced rigid members connected pivotally to the rear ends of the second mentioned members and extending upwardly therefrom in nonparallel relation to the first mentioned rigid members, and a leaf spring connected to the upper end of each of the first mentioned rigid members and extending rearwardly and bowed and connected to the upper end of the corresponding one of the last mentioned rigid members, the second mentioned members being provided with means for connection to a wheel spindle.

3. A device of the class described, including spaced rigid members, means connecting the members, spaced rigid members pivotally connected to the lower ends of the first mentioned members and extending rearwardly therefrom, spaced rigid members connected pivotally to the rear ends of the second mentioned members and extending upwardly therefrom in nonparallel relation to the first mentioned rigid members, a leaf spring connected to the upper end of each of the first mentioned rigid members and extending rearwardly and bowed and connected to the upper end of the corresponding one of the last mentioned rigid members, the second mentioned members being provided with means for connection to a wheel spindle, and a wheel-straddling yoke secured at the lower ends of its arms to the second mentioned rigid members and secured to the intermediate portions of the said springs.

In testimony whereof I affix my signature in presence of two witnesses.

HERB. CHELSTROM. [L. S.]

Witnesses:
   N. P. SWANSON,
   J. H. McLEAN.

Copies of this patent may be obtained for five cents each, by addressing the "Commissioner of Patents, Washington, D. C."